US 12,423,770 B2

(12) United States Patent
Shimizu

(10) Patent No.: US 12,423,770 B2
(45) Date of Patent: Sep. 23, 2025

(54) INFORMATION PROCESSING APPARATUS

(71) Applicant: SONY INTERACTIVE ENTERTAINMENT INC., Tokyo (JP)

(72) Inventor: Keisuke Shimizu, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 486 days.

(21) Appl. No.: 17/421,266

(22) PCT Filed: Jan. 15, 2019

(86) PCT No.: PCT/JP2019/000964
§ 371 (c)(1),
(2) Date: Jul. 7, 2021

(87) PCT Pub. No.: WO2020/148810
PCT Pub. Date: Jul. 23, 2020

(65) Prior Publication Data
US 2022/0101491 A1    Mar. 31, 2022

(51) Int. Cl.
*G06T 3/40* (2024.01)
*G06N 20/00* (2019.01)
*G06T 7/73* (2017.01)

(52) U.S. Cl.
CPC .............. *G06T 3/40* (2013.01); *G06N 20/00* (2019.01); *G06T 7/74* (2017.01); *G06T 2207/20081* (2013.01); *G06T 2207/20084* (2013.01)

(58) Field of Classification Search
CPC ... G06T 3/40; G06T 7/74; G06T 2207/20081; G06T 2207/20084; G06T 19/00; G06N 20/00; H04N 7/18
See application file for complete search history.

(56) References Cited

U.S. PATENT DOCUMENTS

| | | | | |
|---|---|---|---|---|
| 6,807,286 | B1 * | 10/2004 | Krumm .................... | G06F 18/28 382/199 |
| 8,504,546 | B2 * | 8/2013 | Podilchuk ............... | G06F 16/40 707/706 |
| 9,043,247 | B1 * | 5/2015 | Hart ........................ | G06V 30/40 706/12 |

(Continued)

FOREIGN PATENT DOCUMENTS

| | | |
|---|---|---|
| JP | 2012088787 A | 5/2012 |
| JP | 2018116599 A | 7/2018 |

(Continued)

OTHER PUBLICATIONS

Notice of Reasons for Refusal dated Feb. 22, 2022, from Japanese Patent Application No. 2020-566361, 4 sheets.

(Continued)

*Primary Examiner* — Solomon G Bezuayehu
(74) *Attorney, Agent, or Firm* — Fish & Richardson P.C.

(57) ABSTRACT

An information processing apparatus acquires a plurality of reference images obtained by image capturing of a target which is to be reproduced, acquires a plurality of transformed images obtained by scaling up or down each of the reference images, and generates learned data to be used to generate a reproduction image displaying the external appearance of the target, by performing machine learning using, as teacher data, a plurality of learning target images including the plurality of transformed images.

20 Claims, 7 Drawing Sheets

(56) References Cited

U.S. PATENT DOCUMENTS

| | | | | |
|---|---|---|---|---|
| 10,026,176 B2* | 7/2018 | Davidson | | G06T 11/001 |
| 10,272,292 B1* | 4/2019 | Leu | | A61B 5/1123 |
| 10,296,102 B1* | 5/2019 | Misra | | G06T 7/215 |
| 10,402,689 B1* | 9/2019 | Bogdanovych | | G06V 30/242 |
| 10,489,683 B1* | 11/2019 | Koh | | G06V 10/774 |
| 10,540,757 B1* | 1/2020 | Bouhnik | | G06T 3/14 |
| 10,839,586 B1* | 11/2020 | Nemchinov | | G06T 19/00 |
| 11,644,338 B2* | 5/2023 | Wang | | G01C 21/3837 |
| | | | | 701/450 |
| 2004/0175021 A1* | 9/2004 | Porter | | G06V 40/161 |
| | | | | 382/118 |
| 2011/0110594 A1* | 5/2011 | Hasegawa | | G06T 11/60 |
| | | | | 382/190 |
| 2011/0142354 A1* | 6/2011 | Sung | | G06T 7/73 |
| | | | | 382/209 |
| 2012/0076428 A1* | 3/2012 | Yokono | | G06V 40/113 |
| | | | | 382/219 |
| 2012/0288186 A1* | 11/2012 | Kohli | | G06V 10/772 |
| | | | | 382/159 |
| 2013/0226528 A1* | 8/2013 | Hodgins | | B33Y 50/00 |
| | | | | 703/1 |
| 2014/0078320 A1* | 3/2014 | Hong | | G06V 10/52 |
| | | | | 348/208.1 |
| 2015/0002542 A1* | 1/2015 | Chan | | G06T 3/02 |
| | | | | 345/633 |
| 2015/0051512 A1* | 2/2015 | Kim | | A61B 5/1128 |
| | | | | 600/587 |
| 2015/0078628 A1* | 3/2015 | Anderson | | G06F 18/22 |
| | | | | 382/218 |
| 2015/0243031 A1* | 8/2015 | Narasimha | | G06V 10/774 |
| | | | | 382/103 |
| 2016/0379091 A1* | 12/2016 | Lin | | G06V 10/776 |
| | | | | 382/156 |
| 2017/0116473 A1* | 4/2017 | Sashida | | G06V 40/103 |
| 2017/0287109 A1* | 10/2017 | Tasfi | | G06N 3/045 |
| 2018/0025269 A1* | 1/2018 | Dursun | | G06N 3/08 |
| | | | | 175/24 |
| 2018/0232603 A1* | 8/2018 | Shim | | A61B 5/00 |
| 2018/0293706 A1* | 10/2018 | Viswanathan | | G06T 3/4046 |
| 2018/0293753 A1* | 10/2018 | Varadarajan | | G06T 7/73 |
| 2018/0373859 A1* | 12/2018 | Ganong | | G06F 21/64 |
| 2019/0102878 A1* | 4/2019 | Zhang | | G06N 3/042 |
| 2019/0147292 A1* | 5/2019 | Watanabe | | G06F 16/5838 |
| | | | | 382/103 |
| 2019/0174056 A1* | 6/2019 | Jung | | H04N 1/00244 |
| 2019/0205620 A1* | 7/2019 | Yi | | G06N 3/08 |
| 2019/0272620 A1* | 9/2019 | Seip | | G06N 3/044 |
| 2020/0094401 A1* | 3/2020 | Cheng | | B25J 9/163 |
| 2020/0167583 A1* | 5/2020 | Yoon | | G06V 40/161 |
| 2020/0193671 A1* | 6/2020 | Tamir | | G06T 7/251 |
| 2020/0197746 A1* | 6/2020 | Kang | | A61B 5/7425 |
| 2020/0342206 A1* | 10/2020 | Jobin | | H04R 25/652 |
| 2021/0337906 A1* | 11/2021 | Schultz | | G06Q 30/0643 |
| 2021/0366125 A1* | 11/2021 | Jia | | G06F 18/211 |
| 2022/0392099 A1* | 12/2022 | Guay | | G06N 3/084 |
| 2023/0063002 A1* | 3/2023 | Nvs | | G06T 7/62 |
| 2023/0145048 A1* | 5/2023 | Walker | | G06T 7/75 |
| | | | | 382/103 |
| 2023/0218984 A1* | 7/2023 | Callahan | | A63F 13/213 |
| | | | | 463/31 |
| 2024/0062416 A1* | 2/2024 | Yoshida | | G06T 7/74 |
| 2024/0196085 A1* | 6/2024 | Zhou | | H04N 23/61 |

FOREIGN PATENT DOCUMENTS

| | | | | |
|---|---|---|---|---|
| JP | | 2018129007 A | | 8/2018 |
| JP | | 2018136632 A | | 8/2018 |
| JP | | 2018169672 A | | 11/2018 |
| WO | WO-2018029670 A1 * | | 2/2018 | G06F 16/538 |

OTHER PUBLICATIONS

International Preliminary Report on Patentability mailed Jul. 29, 2021, from PCT/JP2019/000964, 16 sheets including translation.

International Search Report and Written Opinion mailed Mar. 26, 2019, from PCT/JP2019/000964, 10 sheets.

* cited by examiner

INFORMATION PROCESSING APPARATUS

TECHNICAL FIELD

The present invention relates to an information processing apparatus, an information processing method, a program, and learned data, for generating an image displaying a target.

BACKGROUND ART

Research of a technology for automatically generating an image by machine learning has been conducted. As one attempt to implement such a technology, a method for generating an image that reproduces a target such as a person, by using, as teacher data, a plurality of captured images obtained by image capturing of the target, has been under study.

SUMMARY

Technical Problems

In the aforementioned technology, even if machine learning is performed by using limited kinds of images as teacher data, only a reproduction image of a pattern that is relatively close to the limited teacher data can be generated. Thus, it is difficult to accurately generate a reproduction image of a pattern that is greatly deviated from the teacher data. However, in order to increase the variation of reproduction images which can be generated, a variety of patterns of images need to be captured. This takes much time.

The present invention has been made in view of the aforementioned circumstances, and one object thereof is to provide an information processing apparatus, an information processing method, a program, and learned data, in which the variation of a reproduction image that reproduces a target can be increased and that requires relatively less time.

Solution to Problem

An information processing apparatus according to one aspect of the present invention includes a reference-image acquisition section that acquires a plurality of reference images obtained by image capturing of a target to be reproduced, a transformed-image acquisition section that acquires a plurality of transformed images obtained by scaling up or down each of the plurality of reference images, and a machine learning section that generates learned data to be used to generate a reproduction image displaying an external appearance of the target, by executing machine learning using, as teacher data, a plurality of learning target images including the plurality of transformed images.

An information processing method according to one aspect of the present invention includes a step of acquiring a plurality of reference images obtained by image capturing of a target to be reproduced, a step of acquiring a plurality of transformed images obtained by scaling up or down each of the plurality of reference images, and a step of generating learned data to be used to generate a reproduction image displaying an external appearance of the target, by executing machine learning using, as teacher data, a plurality of learning target images including the plurality of transformed images.

A program according to one aspect of the present invention for a computer executes a step of acquiring a plurality of reference images obtained by image capturing of a target to be reproduced, a step of acquiring a plurality of transformed images obtained by scaling up or down each of the plurality of reference images, and a step of generating learned data to be used to generate a reproduction image displaying an external appearance of the target, by executing machine learning using, as teacher data, a plurality of learning target images including the plurality of transformed images. This program may be provided by being stored in a computer-readable and non-temporal information storage medium.

Learned data according to one aspect of the present invention is used to generate a reproduction image that is obtained as a result of machine learning using, as teacher data, a plurality of learning target images and that displays an external appearance of an object which is to be reproduced, the plurality of learning target images including a plurality of transformed images obtained by scaling up or down each of a plurality of reference images obtained by image capturing of the object.

An information processing apparatus according to one aspect of the present invention includes an acquisition section that acquires posture data indicating a posture of a target to be reproduced, and a reproduction-image generation section that generates a reproduction image to show a state in which the target is taking a posture indicated by the posture data, by using learned data obtained as a result of execution of machine learning using, as teacher data, a plurality of learning target images, the plurality of learning target images including a plurality of transformed images obtained by scaling up or down each of a plurality of reference images obtained by image capturing of the target.

DESCRIPTION OF EMBODIMENT

Hereinafter, an embodiment of the present invention will be explained in detail on the basis of the drawings.

Figure 1:
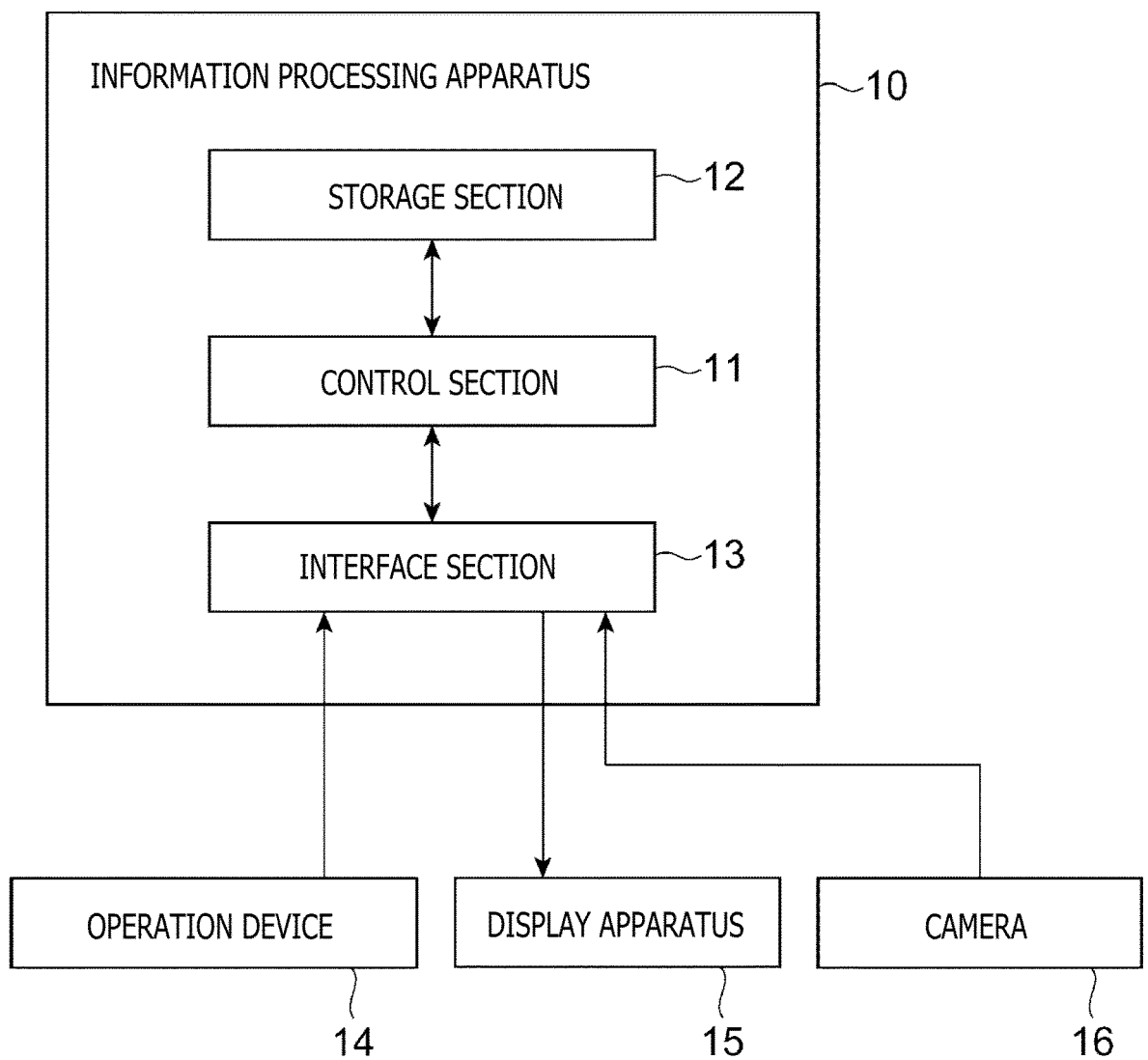
FIG. 1 is a configuration block diagram of an information processing apparatus according to an embodiment of the present invention.

FIG. 1 is a configuration block diagram of an information processing apparatus 10 according to one embodiment of the present invention. The information processing apparatus 10 is a personal computer or the like, and includes a control section 11, a storage section 12, and an interface section 13, as depicted in FIG. 1. Further, the information processing apparatus 10 is connected to an operation device 14, a display apparatus 15, and a camera 16.

The control section 11 includes at least one processor such as a CPU (Central Processing Unit), and executes various information processes by executing a program stored in the storage section 12. It is to be noted that specific examples of the processes to be executed by the control section 11 in the present embodiment will be explained later. The storage section 12 includes at least one memory device such as an RAM (Random-Access Memory), and stores a program which is executed by the control section 11, and data to be processed by the program.

The interface section 13 is an interface for data communication with the operation device 14, the display apparatus 15, and the camera 16. The information processing apparatus 10 is connected to the operation device 14, the display apparatus 15, and the camera 16 via the interface section 13 by wire or wirelessly. Specifically, in order to transmit video data supplied from the information processing apparatus 10 to the display apparatus 15, the interface section 13 includes a multimedia interface such as an HDMI (registered trademark) (High-Definition Multimedia Interface). In addition, in order to receive an operation signal which is received by the operation device 14 and which represents what is indicated by a user operation, and receive a captured image captured by the camera 16, the interface section 13 includes a data communication interface such as a USB (Universal Serial Bus).

The operation device 14 receives an operation instruction from a user and transmits an operation signal indicating the instruction to the information processing apparatus 10. The display apparatus 15 displays a video according to a video signal transmitted from the information processing apparatus 10 such that the user can view the video.

The camera 16 outputs a captured image obtained by image capturing of an area within the field of view. In the present embodiment, when a reproduction image, which will be explained later, is generated, the camera 16 is used to acquire posture data that indicates the posture of a person.

Figure 2:
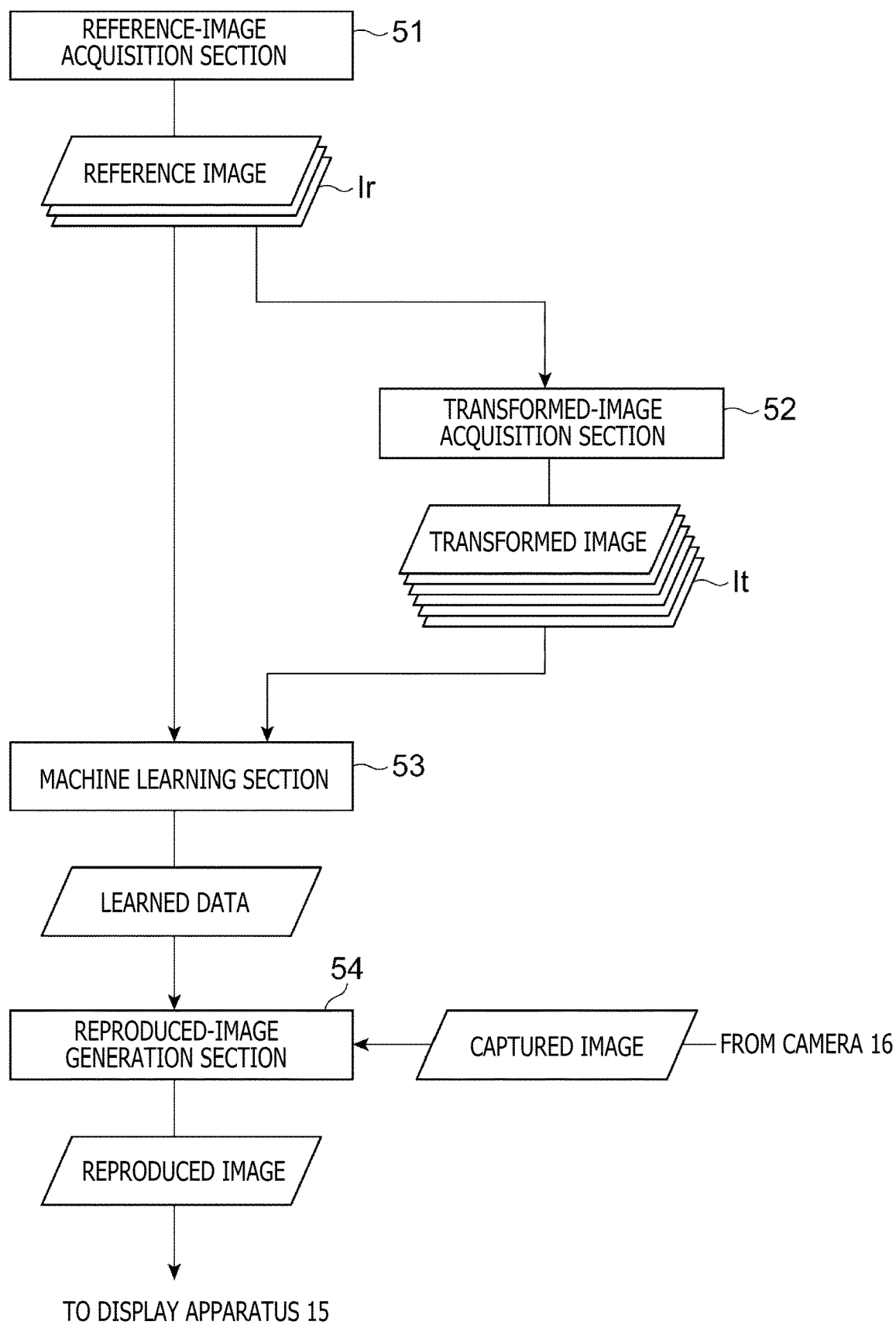
FIG. 2 is a functional block diagram of the information processing apparatus.

Next, functions that are implemented by the information processing apparatus 10 will be explained with reference to FIG. 2. The information processing apparatus 10 is used to perform machine learning upon receiving, as an input, an image displaying the external appearance of an object (target) which is to be reproduced, and to reproduce the external appearance of the target by using the result of the machine learning. As depicted in FIG. 2, the information processing apparatus 10 functionally includes a reference-image acquisition section 51, a transformed-image acquisition section 52, a machine learning section 53, and a reproduction-image generation section 54. These functions are implemented by the control section 11 executing a program stored in the storage section 12. This program may be provided to the information processing apparatus 10 via a communication network such as the internet, or may be stored in a computer-readable information storage medium such as an optical disc, and then, be provided to the information processing apparatus 10.

The reference-image acquisition section 51 acquires data on a reference image Ir that is used as teacher data during machine learning, which will be explained later. In the present embodiment, it is assumed that the reference image Ir is a captured image obtained by actual image capturing of a target which is to be reproduced. In addition, it is assumed that the target is a person who is referred to as a target person T.

It is preferable that the reference image Ir includes almost the entirety of the target person T. However, in a case where a part which is to be reproduced is limited to a part of the target person T, it is sufficient that the reference image Ir includes the part to be reproduced only. In addition, it is preferable that color information such as the background excluding the target person T included in the reference image Ir is as little as possible. Therefore, in a case where the reference image Ir is generated by image capturing of the target person T, an image of the target person T in front of a specific-color screen may be captured, and information regarding the background may be deleted from the reference image Ir by a method that is a generally-called green back or the like. Alternatively, an image obtained by extracting only a part of the target person T from a captured image obtained by actual image capturing of the target person T, may be used as the reference image Ir.

Figure 3:
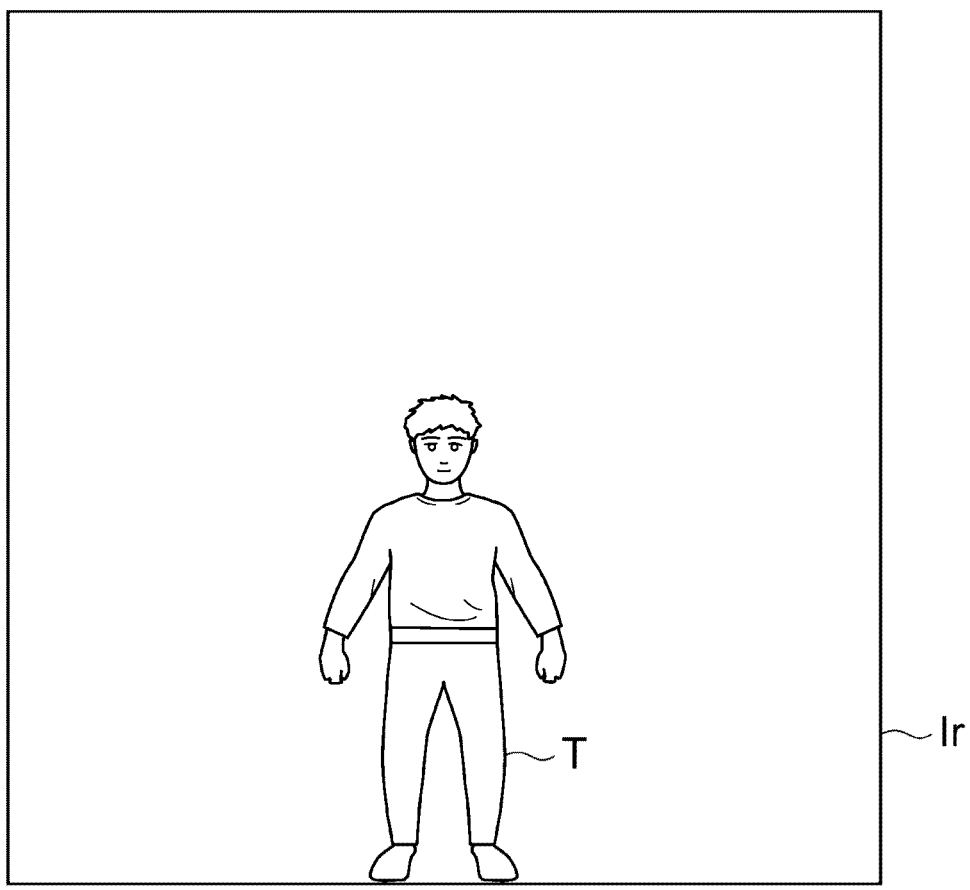
FIG. 3 is a diagram depicting one example of a reference image.

In addition, it is preferable that, in the reference image Ir, a part, of the target person T, to be reproduced is positioned substantially at the center. To this end, during the image capturing, the height of the camera is adjusted such that the position of the eyes of the target person T substantially matches the center, in the vertical direction, of the reference image Ir. Furthermore, the orientation of the camera and the standing position of the target person T are adjusted such that the position of the target person T substantially matches the center in the horizontal direction. Alternatively, a captured image may be clipped afterwards so that the eyes of the target person T are positioned at the center of the reference image Ir. FIG. 3 depicts one example of the reference image Ir that satisfies the aforementioned requirements. It is to be noted that the position of the eyes of the person is set at the center in the aforementioned cases, but another part may be adjusted to be positioned at the center of the reference image Ir.

The reference-image acquisition section 51 acquires data on a plurality of reference images Ir obtained by image capturing of one target person T taking different postures. However, it is assumed that, for each reference image Ir, the distance from the camera to the target person T at the image capturing time does not vary, and is maintained substantially constant. Therefore, in a case where image capturing of the target person T is performed, the image capturing may be performed while the target person T is taking various postures at the same position. Thus, during the image capturing, the position of the camera and the position of the target person T do not need to be changed.

The transformed-image acquisition section 52 acquires data on a transformed image It generated by scaling up the reference image Ir by a predetermined magnification factor. The transformed image It as well as the reference image Ir are used as teacher data for machine learning. In particular, the transformed-image acquisition section 52 is configured to generate a plurality of the transformed images It from one reference image Ir by scaling up the one reference image Ir by different magnification factors. It is to be noted that, in the following explanation, the value of a magnification factor means a magnification factor for both the length and width of the reference image Ir. In addition, it is assumed that the transformed image It is obtained by scaling up a partial region of the reference image Ir while the length-width ratio is kept, and has a size equal to that of the original reference image Ir.

The magnification factors for a plurality of the transformed images It generated on the basis of one reference image Ir, are decided to be values that sequentially become larger in accordance with a geometric progression with respect to the reference image Ir. Specifically, it is assumed that X transformed images It are generated from one reference image Ir, and that the X transformed images It are denoted by transformed images It(1), It(2), . . . , It(X) in the ascending order of the magnification factors thereof. In addition, the maximum magnification factor (i.e., magnification factor of the transformed image It(X)) is defined as Emax. Here, the magnification factors of the respective transformed image It are decided to sequentially become larger in accordance with a common ratio, $$(E\max)^{1/X}.$$

That is, the magnification factor E(n) of the n-th transformed image It(n) is calculated by $$E(n)=(E\max)^{n/X}.$$

In a certain specific example explained below, it is assumed that nine transformed images It(1) to It(9) are generated on the basis of one reference image Ir. In addition, the maximum magnification factor (i.e., the magnification factor of the transformed image It(9)) is set to 4. In this case, the magnification factor E(n) of the transformed image It(n) is calculated in accordance with the following expression, $$E(n)=4^{n/9}.$$

Each of the transformed images It is generated by scaling up only a part of the original reference image Ir such that the transformed image It has a size equal to that of the original reference image Ir. For example, the transformed image It(9) the magnification factor of which is 4 is generated by scaling up a region, of the original reference image Ir, having a ¼ length-and-width size of the transformed image It(9). In a case where the reference image Ir is a 1024×1024-pixel image, the transformed-image acquisition section 52 scales up a 256×256-pixel (=1024/4) square region included in the reference image Ir, thereby generates the transformed image It(9) having a 1024×1024-pixel size which is as large as the original reference image Ir.

Here, it is assumed that a region to be scaled up is centered on the center position of the reference image Ir. However, in a case where a part, of the target person T, to be reproduced is not positioned on the center of the reference image Ir, but is included in a position displaced from the center, a region displaced from the center may be scaled up according to the position of the target person T.

Figure 4:
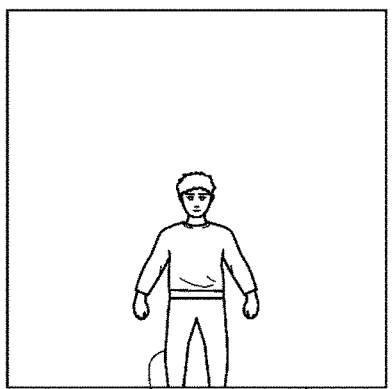
FIG. 4 is a diagram depicting one example of transformed images.
Figure 4:
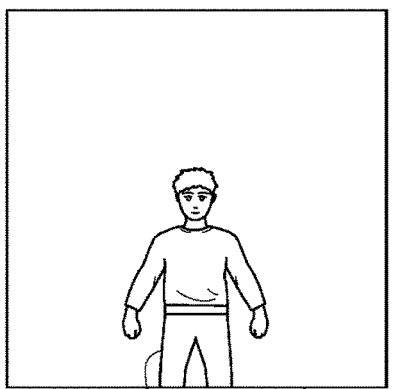
Figure 4:
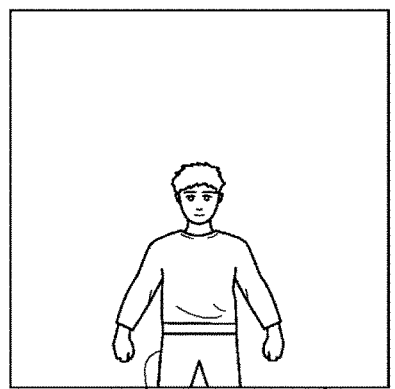
Figure 4:
Figure 4:
Figure 4:
Figure 4:
Figure 4:
Figure 4:

A plurality of the transformed images It obtained by the aforementioned image processing are expected to be close to captured images that can be captured when the target person T is at a position closer to the camera than the position where the image capturing has been actually conducted. That is, images that are corresponding to captured images that can be obtained when the distance from the camera to the target person T varies, can be generated without actual image capturing. Since the respective magnification factors for the plurality of transformed images It are decided to sequentially become larger in accordance with a geometric progression, the transformed images It include the target person T such that the size of the target person T is close to that in a captured image that can be obtained when the distance is varied at equal intervals between the reference image Ir and the transformed image It(9) for which the magnification factor is maximum. FIG. 4 depicts one example of nine transformed images It generated from the reference image Ir depicted in FIG. 3.

The machine learning section 53 executes machine learning using, as teacher data, the transformed images It acquired by the transformed-image acquisition section 52. This machine learning is assumed to be performed regarding the correspondence between the posture and the external appearance of the target person T. Hereinafter, images which are used for the machine learning at the machine learning section 53 are referred to as learning target images. The learning target images at least include the transformed images It. In addition, the learning target images may include the reference image Ir acquired by the reference-image acquisition section 51. In the following explanation, the learning target images include both the reference image Ir and the transformed images It. For example, it is assumed that the reference-image acquisition section 51 acquires 100 reference images Ir obtained by image capturing of the same target person T, and the transformed-image acquisition section 52 generates 9 transformed images It from each reference image Ir by scaling up the 100 reference images Ir by different magnification factors. In this case, the learning target images are 1000 images which are 100 reference images Ir and 900 transformed images It.

Figure 5:
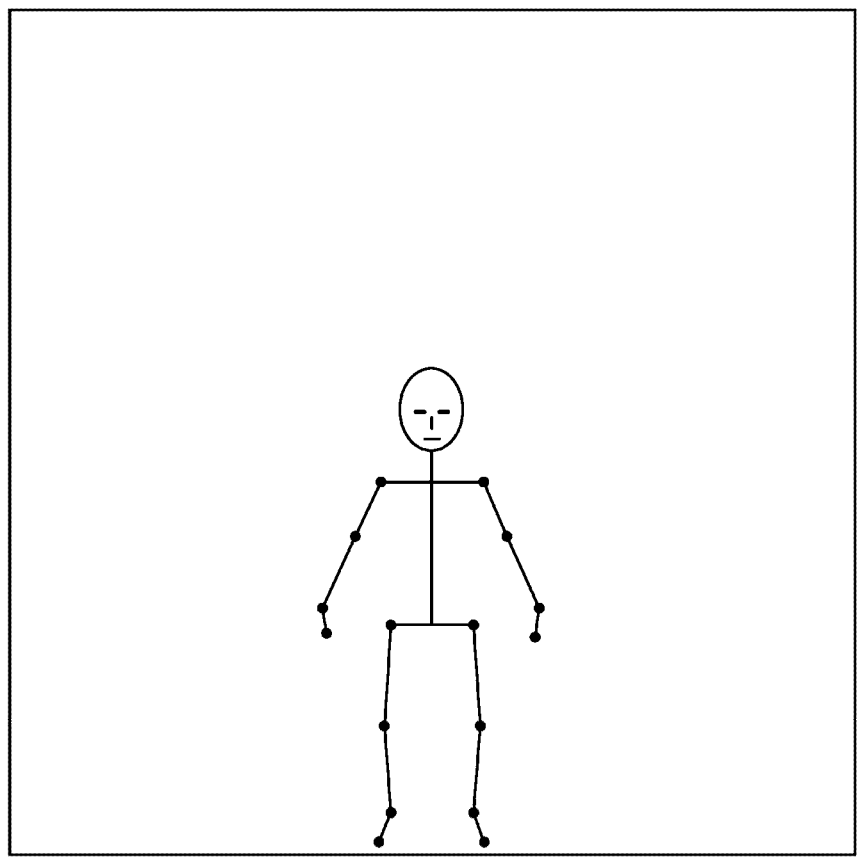
FIG. 5 is a diagram depicting one example of a result of a posture identification process performed on a reference image.

Hereinafter, the machine learning which is executed by the machine learning section 53 will be specifically explained. First, the machine learning section 53 executes a process of identifying a posture of the target person T in each of the acquired learning target images. This posture identification process is executed to identify the positional relation among the parts of a human body and can be executed by a publicly known technology. Posture data obtained as a result of the posture identification process may include a set of coordinate values indicating the positions, in each image, of joints and feature points of the human body. FIG. 5 depicts one example of a skeleton model representing posture data obtained as a result of execution of the posture identification process on the reference image Ir in FIG. 3.

The machine learning section 53 is assumed to execute the posture identification process on, in addition to the reference image Ir, each of the transformed images It which are obtained by scaling up the reference image Ir. Some of the transformed images It may include the target person T at a size different from that in the reference image Ir or in the other transformed images It so that only a part of the body of the target person T is included in such transformed images. Therefore, it is because there may be a difference in the results of the posture identification process between the reference image Ir and a transformed image It obtained by image capturing of the target person T taking the same posture.

It is to be noted that the details of the posture identification process and a target to be subjected to the posture identification process may be changed according to the reproduction precision degree desired for the external appearance of the target person T during a reproduction process, which will be explained later. For example, if an action of a finger of the target person T needs to be reproduced, the position of the finger in each learning target image needs to be identified, and be used for the machine learning. Also, if expression of the target person T is desired to be reproduced, the positions and conditions of the eyes and mouth, etc., included in the face of the target person T in each learning target image may be identified as a part of the posture data on the target person T.

After the posture identification process is finished, the machine learning section 53 selects teacher data to be actually used for the machine learning, by using the posture identification process result. This teacher data selection process is not mandatory. All the obtained learning target images may be used as the teacher data for the machine learning. However, if a learning target image that is expected to make no contribution or little contribution is excluded from the teacher data through the selection process, a time and a calculation amount, etc., required to perform the machine learning can be reduced, whereby the process efficiency can be improved.

In one example of the teacher data selection process, the machine learning section 53 may exclude, from the teacher data, a learning target image that lacks a specific part of the target person T. This specific part is the head of the target person T, for example. When the target person T is taking a certain posture such as a forward bending posture, the head of the target person T is displaced from the center of the reference image Ir. As a result, when the transformed image It is generated by scaling up the center region of the reference image Ir, the head of the target person T is not included in the transformed image It. Even when this transformed image It is used as an input for the machine learning, it is difficult to effectively learn the correspondence between the posture and the external appearance of the target person T. Accordingly, a learning target image that lacks an important part is excluded from the teacher data. It is to be noted that the selection process in which whether or not a specific part is included is a determination criterion, may be executed on only the transformed images It. In addition, in a case where the posture identification process on the learning target image fails or in a case where the accuracy of an identified posture is determined to be low, the corresponding learning target image may be excluded from the teacher data.

In another example of the teacher data selection process, in a case where a plurality of learning target images that are determined to include the similar posture are found, the machine learning section 53 may select some of the learning target images only as the teacher data and exclude the remaining learning target images from the teacher data. In order to execute this similarity determination process, the machine learning section 53 classifies the posture data (posture identification results) obtained from the learning target images, for example, such that the learning target images are grouped according to whether the images are determined to have the similar posture. This classification process may be executed by a publicly-known clustering technology such as k-means clustering.

This classification process is desirably executed not on all the learning target images, but independently on a group of the reference images Ir and a group of the transformed images It the magnification factor of which is equal to one another. That is, on the basis of the result of the classification process of a group including the reference images Ir only, the machine learning section 53 excludes, from the teacher data, reference images Ir that are determined to include posture data similar to the posture data in the other reference images Ir. In addition, the classification process is executed independently for each of nine groups of the transformed images It to which the transformed images It of the same magnification factor respectively belong to, such as a group of the transformed images It(1) obtained by scaling up by a magnification factor of $4^{1/9}$, and a group of the transformed images It(2) obtained by a magnification factor of $4^{2/9}$, and then, transformed images It including the similar posture to the posture in another transformed image It are excluded from the teacher data. The classification process is independently executed for each magnification factor in the aforementioned manner because the sizes of the target person T included in the learning target images differ according to the magnification factors, and, as a result, a part that makes a contribution to the posture similarity also changes. For example, it is highly likely that the reference images Ir each including the entire body of the target person T are determined to include the similar posture if the positions of the hand and the leg are closed to one another. On the other hand, even if the expression of the target person T differ among a plurality of the reference images Ir, the positions of the eyes and the mouth in the reference image Ir do not greatly vary. Therefore, positional information regarding these parts in the face makes a relatively small contribution to the posture similarity. In contrast, in the transformed image It(9) of the maximum magnification factor, only a limited region centered on the face of the target person T is included in the image, and the hands or legs are not included in the image, as depicted in FIG. 4. Therefore, the difference in the positions of the hands and legs does not make any contribution to the posture similarity, while the positions of the eyes and the mouth included in the face are important for determining the posture similarity. As a result of the classification process based on the magnification-factor groups, one reference image Ir is determined to include the similar posture to that in another reference image Ir, and is excluded from the teacher data, while the transformed image It obtained by scaling up the excluded reference image Ir is used as the teacher data, in some cases. When the teacher data to be actually used for the machine learning is narrowed down on the basis of the classification process result in the aforementioned manner, relatively less images are used as the teacher data so that the learning can be efficiently performed.

It is to be noted that the aforementioned selection processes may be executed in combination. Further, besides the aforementioned ones, various determination criteria may be used to select a learning target image to be excluded from the teacher data.

After selecting, as the teacher data, a learning target image to be actually used for the machine learning, the machine learning section 53 uses, as an input, a pair of the selected learning target image and posture data identified on the basis of the learning target image, and learns what type of an image of the external appearance of the target person T who is taking the posture is obtained. Such machine learning can be performed by a machine learning algorithm using a neural network or the like. As a result of this machine learning, learned data for implementing a predictor that predicts an image indicating the external appearance of the target person T from the posture data indicating the posture of the target person T is generated.

The reproduction-image generation section 54 generates an image (reproduction image) in which the external appearance of the target person T is reproduced, by using the learned data obtained by the machine learning executed by the machine learning section 53. Specifically, the reproduction-image generation section 54 acquires posture data (skeleton model data) indicating a posture that the target person T is desired to take, and inputs the posture data to the predictor that uses learned data generated by the machine learning section 53. The predictor predicts the external appearance of the target person T taking the posture indicated by the skeleton model data, and outputs an image of the prediction result.

More specifically, in the present embodiment, a video (reproduction video) in which the target person T looks like the target person T is taking an action corresponding to an action of a person (hereinafter, referred to as user U) different from the target person T, is generated by reflecting the action of the user US, and is outputted. In order to perform such control, the reproduction-image generation section 54 acquires a captured image obtained by image capturing of the user U by means of the camera 16. Here, an image capturing condition of the image capturing of the user U by the camera 16 is desirably to be close to an image capturing condition on which image capturing of the target person T has been performed to prepare the reference image Ir. That is, the camera 16 may be identical to or different from the camera having captured an image of the target person T, but the resolutions thereof are desirably equal to each other. In addition, the height of the camera 16 at the image capturing time is desirably set to be close to the height of the camera when the image capturing of the target person T has been performed.

Figure 6:
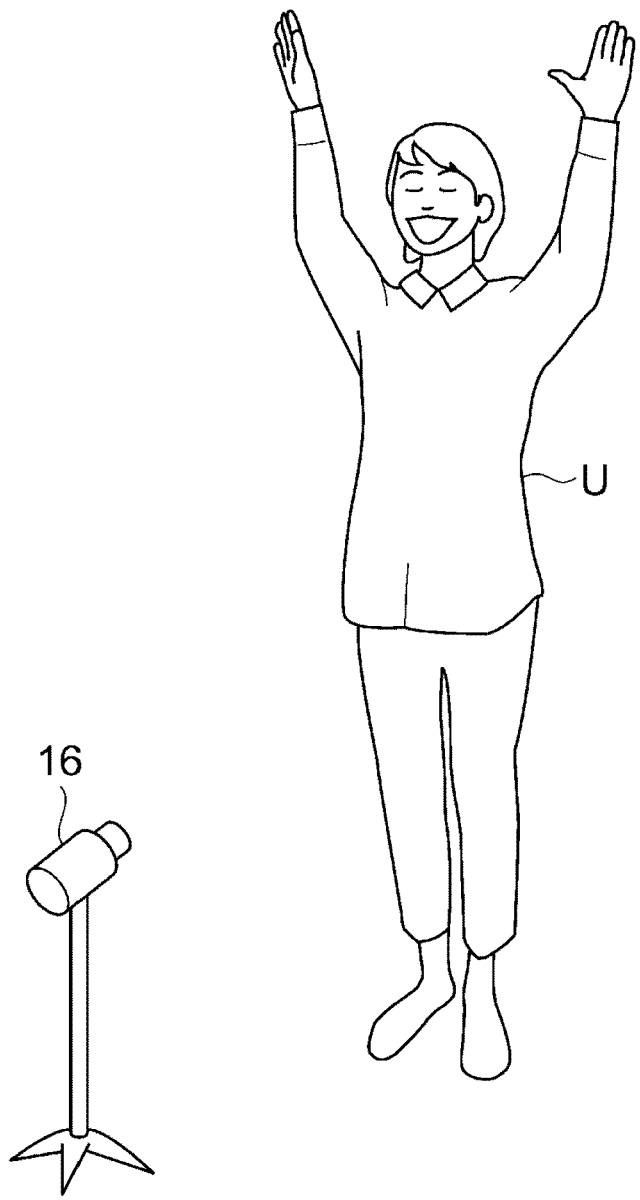
FIG. 6 is a diagram depicting a state in which image capturing of a user is performed.

However, the distance between the camera 16 and the user U does not need to be fixed. The user U may move toward and away from the camera 16. However, it is desirable that the distance range does not exceed the distance between the camera and the target person T when the image capturing to acquire the reference image Ir has been performed. In addition, since the maximum factor to generate the transformed image It is set to 4 for both the width and the length in the above explanation, it is not preferable that the distance to the camera 16 becomes so short that the user U appears to be large in size exceeding the above maximum factor. However, when the above distance is within a distance range from the distance corresponding to the reference image Ir to the distance corresponding to the transformed image It of the maximum magnification factor, image capturing can be performed while the user U is moving toward any position. FIG. 6 depicts a situation in which the image capturing of the user U is performed in this case.

The reproduction-image generation section 54 executes a posture identification process of an image including the user U captured by the camera 16. This posture identification process is executed by the same algorithm used for the posture identification process executed on the learning target images by the machine learning section 53 to generate learning target data. As a result of the posture identification process, posture data indicating the posture of the user U at the image capturing time point can be obtained.

Figure 7:
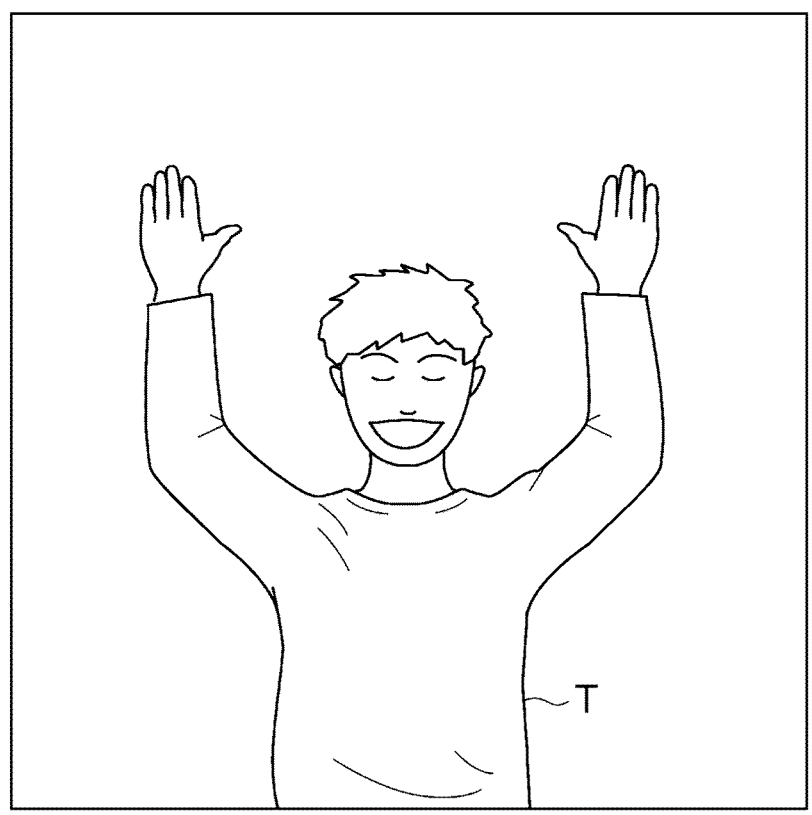
FIG. 7 is a diagram depicting one example of a reproduction image.

The reproduction-image generation section 54 inputs the posture data about the user U to the predictor that uses the learned data generated by the machine learning section 53. As a result of this, a reproduction image displaying a situation in which the target person T is taking the same posture as the user U is generated. The reproduction-image generation section 54 renders and displays the reproduction image on a screen of the display apparatus 15. The reproduction image display process based on the captured image of the user U in accordance with the aforementioned procedures is repeatedly executed in real time while the user U variously changes the posture. Accordingly, a reproduction video displaying a situation in which the target person T moves in the same manner as the user U can be generated and displayed. FIG. 7 depicts one example of a reproduction image of the target person T generated by the reproduction-image generation section 54 according to the posture of the user U depicted in FIG. 6.

Here, when learned data obtained by the machine learning using a plurality of the reference images Ir obtained by image capturing of the target person T who is taking various postures is used, the reproduction-image generation section 54 can generate a reproduction image by predicting the external appearance of the target person if the target person T takes a posture different from the actual one. Moreover, the learned data obtained as a result of the machine learning including not only the reference image Ir but also the transformed images It is used so that the reproduction-image generation section 54 can reproduce the external appearance of the target person T with relatively good accuracy even when the user U is at a distance to the camera 16 shorter than the distance when image capturing of the target person T is performed. Accordingly, in a case where the user U takes various actions including movement along the image capturing direction of the camera 16, a video displaying a situation in which the target person T is taking the same action can be displayed. As a result of this process, a video displaying a situation in which the target person T, such as a person at a reception desk, who does not actually exist at the desk, is taking an action in response to an actually generated situation can be generated in real time, and be presented to a viewer.

It is to be noted that a reproduction image generated by the reproduction-image generation section 54 may be obtained by transforming a region excluding a part including the target person T to transparent pixels. This transformation of pixels can be implemented by transforming pixels, in a generated reproduction image, having the same color as the background color of the reference image Ir into transparent pixels. The reproduction image having the transparent background is combined with a predetermined background image so that an image in which the target person T appears in a place where the target person T actually does not exist can be generated. In a case where this image combining is performed, a process of making the boundary portion between the background image and the target person T inconspicuous by adjusting the brightness of the background image according to the brightness of the target person T, or by adding Gaussian noise to the boundary portion, may be executed, for example.

As explained so far, the information processing apparatus 10 according to the present embodiment can generate an image that reproduces a situation in which the target person T is taking various actions including forward and rearward movements, on the basis of an image obtained by image capturing of the target person T staying at a fixed position.

It is to be noted that the embodiments of the present invention are not limited to the aforementioned one. For example, a target which is to be reproduced is a person in the above explanation, but any one of various types of objects, such as an animal the posture of which varies, can be adopted. In addition, only one target person T is a target which is to be reproduced in the above explanation, but a plurality of reference images Ir may be acquired for each of a plurality of target persons, and the machine learning is performed on the reference images Ir independently to generate learned data so that the plurality of target persons can be reproduced. In this case, the reproduction-image generation section 54 receives a selection of a target person to be reproduced from a user, reads out learned data corresponding to the selected target person, and uses the learned data in order to generate a reproduction image.

In addition, one information processing apparatus 10 executes both the machine learning and the process of generating a reproduction image in the above explanation, but the present invention is not limited to this embodiment. The machine learning and the process may be performed by different information processing apparatuses. In this case, an information processing apparatus having performed the machine learning provides the resultant learned data to an external information processing apparatus, by storing the learned data to a computer-readable information recording medium or by distributing the learned data over a communication network. The information processing apparatus having received the learned data can implement the aforementioned function of the reproduction-image generation section 54 by using the provided learned data.

In addition, various parameters such as magnification factors for transformed images and the number of transformed images generated on the basis of one reference image in the above explanation are just examples. Furthermore, a transformed image is an up-scaled image obtained by scaling up a reference image in the above explanation, but the present invention is not limited to this embodiment. A down-scaled image obtained by scaling down a reference image by a predetermined magnification factor may be used as a transformed image for machine learning. When such a down-scaled image is used for the machine learning, a reproduction image in which the target person T is accurately reproduced can be generated even in a case where the user U is at a distance from the camera 16 farther than the distance from the camera to the target person T at the capturing time of the reference image.

REFERENCE SIGNS LIST

10: Information processing apparatus
11: Control section
12: Storage section
13: Interface section
14: Operation device
15: Display apparatus
16: Camera
51: Reference-image acquisition section
52: Transformed-image acquisition section
53: Machine learning section
54: Reproduction-image generation section

The invention claimed is:

1. An information processing apparatus, comprising:
a memory storing computer executable instructions; and
a processor configured to execute the computer executable instructions to control the apparatus to:
acquire a plurality of first images of a first user;
generate a plurality of transformed images of the first user, the generating including:
executing a transformation process of scaling up or down each of the plurality of first images of the first user by a plurality of different magnification factors such that a quantity of the plurality of transformed images of the first user is an integer multiple of the plurality of first images of the first user where the integer corresponds to a number of the plurality of different magnification factors,
executing a similarity determination process of classifying one transformed image as having posture data similar to posture data of another transformed image based upon the posture data of the one transformed image and the posture data of the other transformed image meeting a similarity threshold, the similarity threshold representing that postures are more similar than dissimilar, and
executing an exclusion process of excluding, from the plurality of transformed images, the one transformed image classified as having the posture data similar to the posture data of the other transformed image;
generate learned data based on the plurality of transformed images of the first user that was generated through the transformation process, the similarity determination process, and the exclusion process;
acquire a second image of a second user that is different from the first user;
generate posture data indicating a posture of the second user in the second image; and
generate, using the learned data generated based on the plurality of transformed images of the first user and the posture data indicating the posture of the second user, a reproduction image of the first user with the posture of the second user in the second image.

2. The information processing apparatus according to claim 1, wherein the learned data is generated based on a plurality of learning target images including the plurality of first images of the first user and the plurality of transformed images of the first user that was generated through the transformation process, the similarity determination process, and the exclusion process.

3. The information processing apparatus according to claim 2, wherein the processor is configured to execute the computer executable instructions to control the apparatus to execute, on each of the learning target images, a process including:
identifying a posture of a target included in the learning target image,
executing machine learning using the posture data and the learning target image, and
generating the learned data.

4. The information processing apparatus according to claim 3, wherein the processor is configured to execute the computer executable instructions to control the apparatus to exclude from the machine learning a learning target image that is determined to lack a predetermined part of the target as a result of the identifying the posture.

5. The information processing apparatus according to claim 1, wherein the processor is further configured to execute the computer executable instructions to control the apparatus to:
after executing the transformation process and before executing the similarity determination process, classify the plurality of transformed images of the first user into a plurality of groups each including transformed images exclusively scaled up or down by a same magnification factor of the plurality of different magnification factors;
independently execute the similarity determination process on each of the groups independently; and
independently execute the exclusion process on each of the groups.

6. The information processing apparatus according to claim 1, wherein the plurality of different magnification factors sequentially change in accordance with a geometric progression.

7. An information processing method, comprising:
acquiring a plurality of first images of a first user;
generating a plurality of transformed images of the first user, the generating including:
executing a transformation process of scaling up or down each of the plurality of first images of the first user by a plurality of different magnification factors such that a quantity of the plurality of transformed images of the first user is an integer multiple of the plurality of first images of the first user where the integer corresponds to a number of the plurality of different magnification factors,
executing a similarity determination process of classifying one transformed image as having posture data similar to posture data of another transformed image based upon the posture data of the one transformed image and the posture data of the other transformed image meeting a similarity threshold, the similarity threshold representing that postures are more similar than dissimilar, and
executing an exclusion process of excluding, from the plurality of transformed images, the one transformed image classified as having the posture data similar to the posture data of the other transformed image;

generating learned data based on the plurality of transformed images of the first user that was generated through the transformation process, the similarity determination process and the exclusion process;

acquiring a second image of a second user that is different from the first user;

generating posture data indicating a posture of the second user in the second image; and generating, using the learned data generated based on the plurality of transformed images of the first user and the posture data indicating the posture of the second user, a reproduction image of the first user with the posture of the second user in the second image.

8. A non-transitory computer readable medium storing computer executable instructions which, when executed by a processor of an apparatus, cause the apparatus to perform a process comprising:

acquiring a plurality of first images of a first user;

generating a plurality of transformed images of the first user, the generating including:

executing a transformation process of scaling up or down each of the plurality of first images of the first user by a plurality of different magnification factors such that a quantity of the plurality of transformed images of the first user is an integer multiple of the plurality of first images of the first user where the integer corresponds to a number of the plurality of different magnification factors, executing a similarity determination process of classifying one transformed image as having posture data similar to posture data of another transformed image based upon the posture data of the one transformed image and the posture data of the other transformed image meeting a similarity threshold, the similarity threshold representing that postures are more similar than dissimilar, and executing an exclusion process of excluding, from the plurality of transformed images, the one transformed image classified as having the posture data similar to the posture data of the other transformed image;

generating learned data based on the plurality of transformed images of the first user that was generated through the transformation process, the similarity determination process and the exclusion process;

acquiring a second image of a second user that is different from the first user;

generating posture data indicating a posture of the second user in the second image; and generating, using the learned data generated based on the plurality of transformed images of the first user and the posture data indicating the posture of the second user, a reproduction image of the first user with the posture of the second user in the second image.

9. The information processing apparatus according to claim 1, wherein the processor is configured to execute the computer executable instructions to control the apparatus to:

acquire a plurality of second images of the second user; and for each second image of the plurality of second images:
generate posture data indicating a posture of the second user in the corresponding second image; and
generate a reproduction image of the first user with the posture of the second user in the corresponding second image.

10. The information processing apparatus according to claim 9, wherein the processor is configured to execute the computer executable instructions to control the apparatus to generate a reproduction video, and frames of the reproduction video include the reproduction images generated for each of the plurality of second images.

11. The information processing apparatus according to claim 1, wherein the processor is further configured to execute the computer executable instructions to control the apparatus to output the reproduction image.

12. The information processing apparatus according to claim 1, wherein the reproduction image is output to a display for display by the display.

13. The information processing method according to claim 7, wherein the learned data is generated based on a plurality of learning target images including the plurality of first images of the first user and the plurality of transformed images of the first user that was generated through the transformation process, the similarity determination process, and the exclusion process.

14. The information processing method according to claim 13, further comprising:

identifying a posture of a target included in the learning target image, executing machine learning using the posture data and the learning target image, and generating the learned data.

15. The information processing method according to claim 14, further comprising excluding from the machine learning a learning target image that is determined to lack a predetermined part of the target as a result of the identifying the posture.

16. The information processing method according to claim 7, further comprising:

after executing the transformation process and before executing the similarity determination process, classifying the plurality of transformed images of the first user into a plurality of groups each including transformed images exclusively scaled up or down by a same magnification factor of the plurality of different magnification factors;

independently executing the similarity determination process on each of the groups independently; and independently executing the exclusion process on each of the groups.

17. The information processing method according to claim 7, further comprising:

acquiring a plurality of second images of the second user; and for each second image of the plurality of second images:
generating posture data indicating a posture of the second user in the corresponding second image; and
generating a reproduction image of the first user with the posture of the second user in the corresponding second image.

18. The information processing method according to claim 7, further comprising outputting the reproduction image.

19. The information processing apparatus according to claim 4, wherein the processor is configured to execute the computer executable instructions to control the apparatus to exclude from the machine learning only the learning target image that is one of the plurality of transformed images of the first user.

20. The information processing apparatus according to claim 6, wherein the geometric progression sets each of the plurality of different magnification factors as a function of a maximum magnification factor.

* * * * *